United States Patent [19]

Rozman et al.

[11] Patent Number: 5,233,286
[45] Date of Patent: Aug. 3, 1993

[54] HYBRID 270 VOLT DC SYSTEM

[75] Inventors: Gregory I. Rozman; Paul E. Nuechterlein, both of Rockford; Albert L. Markunas, Roscoe; Madan L. Bansal, Rockford, all of Ill.

[73] Assignee: Sundstrand Corporation, Rockford, Ill.

[21] Appl. No.: 737,329

[22] Filed: Jul. 29, 1991

[51] Int. Cl.⁵ .............................................. H02P 9/00
[52] U.S. Cl. ......................................... 322/90; 363/37
[58] Field of Search ............... 322/25, 28, 90; 363/37, 363/64, 65, 95, 97, 98, 71, 72, 131, 132

[56] References Cited

U.S. PATENT DOCUMENTS

| | | | |
|---|---|---|---|
| 3,461,310 | 8/1969 | Pintell | 307/151 |
| 3,538,405 | 11/1970 | Borden et al. | 318/67 |
| 3,746,963 | 7/1973 | VeNard, II | 363/47 |
| 4,163,906 | 8/1979 | Shimamura | 307/39 |
| 4,684,873 | 8/1987 | Glennon | 322/90 X |
| 4,692,684 | 9/1987 | Schaeffer | 322/90 |
| 4,737,899 | 4/1988 | Lorec | 363/24 |
| 4,816,978 | 3/1989 | Domenget et al. | 363/21 |
| 4,816,981 | 3/1989 | Nishihiro et al. | 363/37 |
| 5,031,086 | 7/1991 | Dhyanchand et al. | 363/37 |

Primary Examiner—Steven L. Stephan
Assistant Examiner—Kristine Peckman
Attorney, Agent, or Firm—Wood, Phillips, VanSanten, Hoffman & Ertel

[57] ABSTRACT

The problem of providing isolated DC power in a 270 volt DC power system (10) has been resolved with the use of a DC—DC converter (44) for providing isolated DC power on busses (46-48) for powering pulsating loads (66), avionics DC loads (68) and AC loads (64). The use of the converter (44) further allows for reduction in size of ripple filters (92-94) and damper circuits (50-52).

16 Claims, 7 Drawing Sheets

HYBRID 270 VOLT DC SYSTEM

FIELD OF THE INVENTION

This invention relates to electrical power systems and, more particularly, to a system for developing isolated power for plural busses.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil.

Aircraft power systems include plural loads to be powered. Such loads may include avionics DC loads, such as electronic systems, pulsating loads, such as radar, and AC loads, such as fans. The generator comprises a DC exciter followed by a rotating rectifier and a synchronous main generator. The AC power developed in the main generator stator coil is rectified to provide DC power on a DC link. This power, which may be on the order of 270 volts DC, can be provided directly to DC loads, through DC—DC converter circuits to DC loads, or through an inverter circuit to an AC bus for powering AC loads.

Pulsating loads generate significant repetitive voltage transients in the power system. Such transients must be effectively controlled by a generator control unit.

For DC bus protection, prior systems typically utilize DC circuit breakers and DC current sensors, such as Hall effect devices, which tend to be more expensive and larger in size and weight than AC circuit breakers and AC current sensors, such as current transformers. In an application such as an aircraft, size and weight criteria are quite important due to limitations therefor.

The present invention is intended to solve one or more of the problems discussed above in a novel and simple manner.

FIELD OF THE INVENTION

In accordance with the present invention, an electrical power generating system (EPGS) provides isolated power for powering DC loads, pulsating loads, and AC loads.

It is one object of the invention to provide an EPGS which reduces the effect of pulsating loads on other DC loads.

It is yet another object of the invention to provide an EPGS which includes reduced size and weight of a DC bus ripple filter.

It is still a further object of the invention to provide an EPGS which utilizes full system isolation.

It is still a further object of the invention to provide an EPGS which utilizes AC circuit breakers and AC current sensors, such as current transformers.

Broadly, there is disclosed herein an electrical power generating system for developing isolated power for powering DC loads, pulsating loads, and AC loads. The EPGS comprises a generator including a main generator and an exciter providing field current to the main generator for developing AC power. A rectifier is connected to the main generator for converting AC power to DC power. A DC—DC converter is connected to the rectifier and includes means for developing DC power supplied to three DC power busses, each bus being electrically isolated from one another, a first such bus for powering DC loads, a second such bus for powering pulsating loads. A DC-AC converter is connected to a third such bus for converting DC power to AC power for powering AC loads. Means are provided for sensing a characteristic of power to one of the power busses. A generator control unit is connected to the sensing means and the generator for controlling generator AC output power responsive to the sensed characteristic.

In accordance with one aspect of the invention, the developing means comprises a transformer having a single primary winding and three secondary windings.

In accordance with another aspect of the invention, the developing means comprises three transformers each having a primary winding and a secondary winding.

It is a feature of the invention that the developing means includes a switching circuit connected to the rectifier and switched at a relatively high frequency to produce high frequency AC power, a transformer having a primary winding connected to the switching circuit and a secondary winding, and a rectifier circuit connected to the secondary winding for converting the high frequency AC power to DC power.

It is a feature of the invention that the EPGS is provided with an AC circuit breaker connected in series with each transformer secondary winding.

More specifically, the EPGS includes a generator for developing AC power which is rectified and filtered to develop DC power on a DC link. A DC—DC switchmode power converter is connected to the DC link for providing DC power supplied to a plurality of isolated DC power busses. The switchmode power converter circuit is a high frequency power converter which acts as an active filter to significantly reduce the requirements of a DC ripple filter and which uses isolation transformer operation for providing isolated power busses. Damper circuits are connected across the outputs of the converter. A generator control unit contains a voltage regulator and other protective electronics, wherein the voltage regulator regulates excitation in the generator in accordance with the power on one of the DC busses.

Alternatively, the DC—DC converter can be replaced with three smaller DC—DC switchmode converters to reduce system interaction and improve system modularity.

Further features and advantages of the invention will readily be apparent from the specification and from the drawings.

DESCRIPTION OF THE INVENTION

Figure 1:
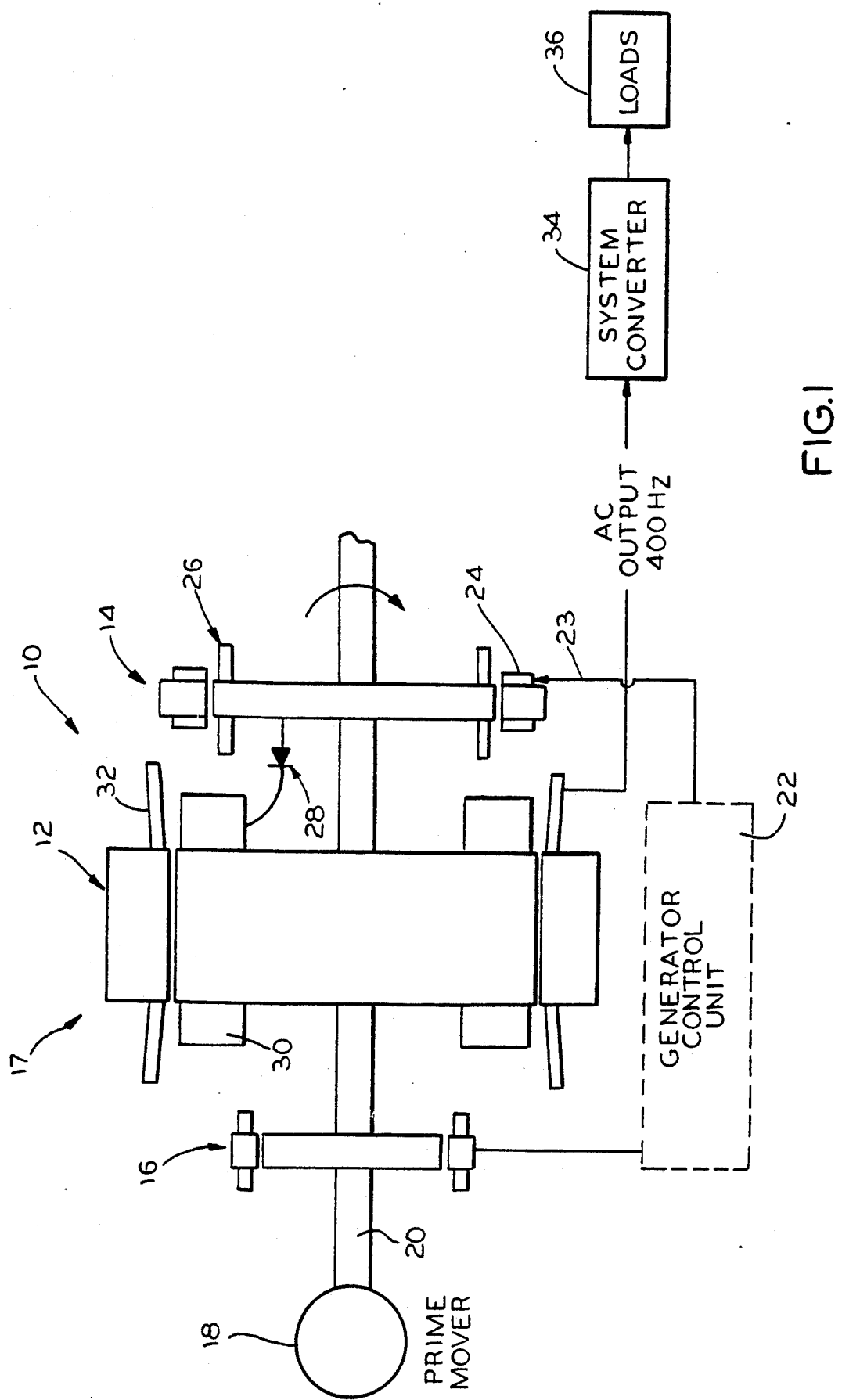
FIG. 1 is a combined diagrammatic illustration-block diagram of an electrical power generating system according to the invention.

Referring first to FIG. 1, an electrical power generating system (EPGS) 10 includes a main generator 12, an exciter 14 for providing main field current to the main generator 12 and a permanent magnet generator (PMG) 16. Each of the main generator 12, exciter 14, and PMG 16, referred to collectively as a generator 17, are driven by a prime mover 18 through a common shaft 20.

A generator control unit (GCU) 22 receives the power developed by the PMG 16 and delivers a controlled current on a line 23 to a DC field winding 24 of the exciter 14. As is conventional in brushless power systems, rotation of the shaft 20 by the prime mover 18 results in generation of a polyphase voltage in armature windings 26 of the exciter 14. This polyphase voltage is rectified by a rotating rectifier bridge, illustrated generally at 28, and the rectified power is coupled to a field winding 30 of the main generator 12. The current in the field winding 30 and the rotation of the shaft 20 sets up a rotating magnetic field in the space occupied by a set of main generator stator windings 32. The stator windings 32 develop polyphase AC output power which is delivered to a system converter 34 for powering loads 36.

In a typical application, the prime mover 18 is the main engine in an aircraft, and the system converter 34 is part of a power source which develops 270 volt DC power for powering pulsating loads, and avionics DC loads, and for providing AC power at, for example, 400 Hz for supplying AC loads.

Figure 2:
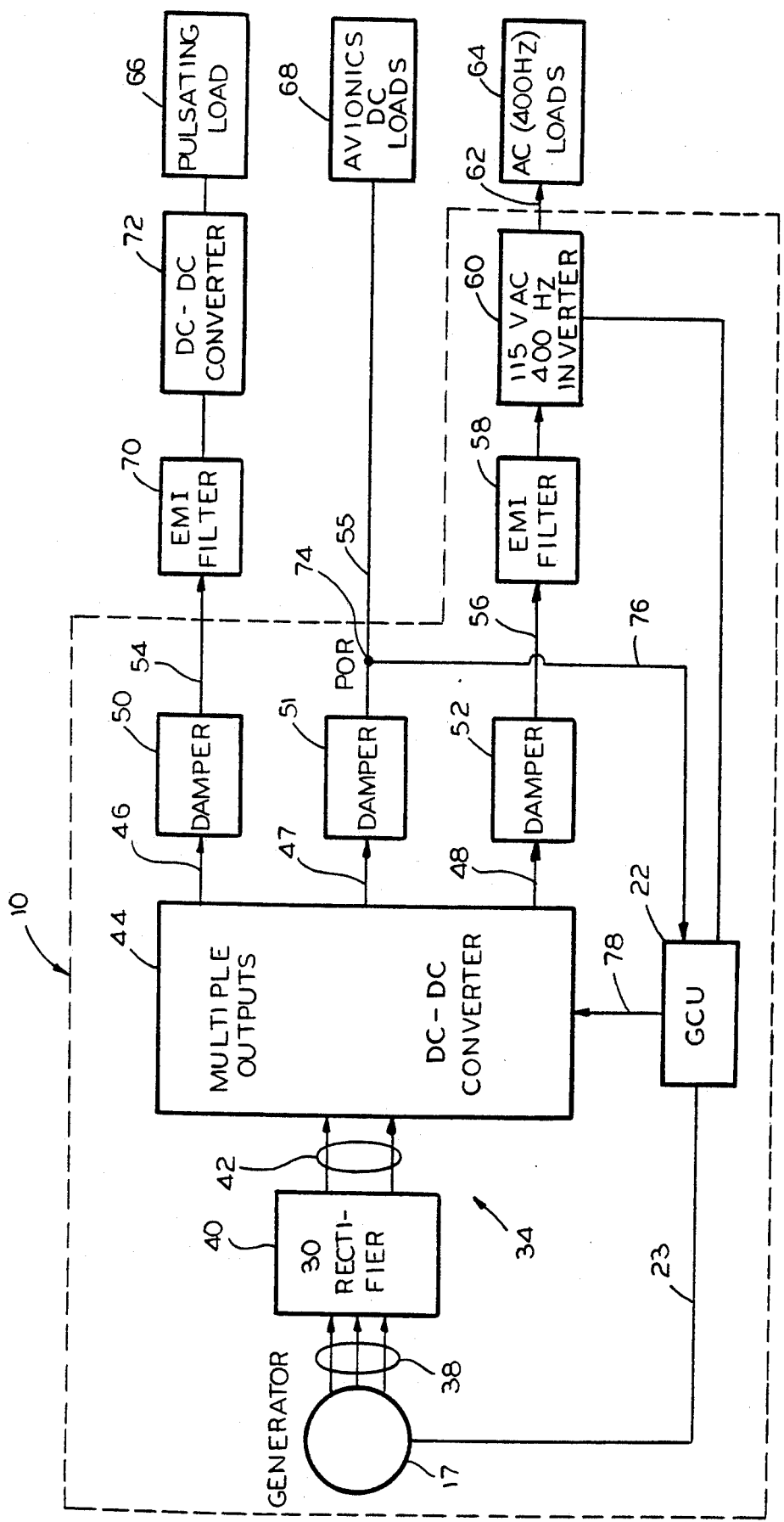
FIG. 2 is a generalized more detailed block diagram of an EPGS according to a first embodiment of the invention.

Referring now to FIG. 2, the EPGS 10 is illustrated in greater detail in block diagram form for a first embodiment of the invention.

The generator 17 develops polyphase output power on a feeder 38 to the system converter 34. The system converter 34 includes an AC/DC converter in the form of a full wave bridge rectifier 40 of conventional construction which is operable to convert three-phrase AC power to DC power. The DC power is supplied to a DC link 42 which is connected to a multiple output DC—DC converter 44. The converter 44 develops DC power supplied to three DC power busses 46-48, each said bus 46-48 being electrically isolated from one another. Each bus 46-48 is further connected to a respective damper circuit 50-52. The damper circuits 50-52 are used to provide stable operation. The output of each damper circuit 50-52 comprises DC power on further isolated DC busses 54-56. The third bus 56 is connected through an EMI filter 58 to an inverter circuit 60. The inverter 60 may comprise a voltage source inverter having six power switches connected in a three-phase bridge configuration for developing AC power on an AC output bus 62 for powering AC loads 64. The switching of the power switches in the inverter 60 are controlled by the GCU 22 in any known manner to control power to the AC load 64.

The DC power output busses 54 and 55 are used for powering respective pulsating loads 66 and avionics DC loads 68. The pulsating loads are connected to the first DC bus 54 via an EMI filter 70 and a DC—DC converter 72. The DC—DC converter 72 is used for converting the 270 volt DC signal from the bus 54 to a suitable level for powering the pulsating loads 66. Although the avionics DC load 68 are shown directly connected to the second DC bus 55, other converter circuits for controlling voltage levels, as necessary, may be provided.

A sensor 74 senses a characteristic of power on the second DC output bus 55. This sensor 74 may sense output voltage or current, as necessary. The sensor 74 is connected via a line 76 to the GCU 22. The GCU 22 in turn provides voltage regulation by controlling current to the exciter DC field winding 26, see FIG. 1, as discussed above to control at the point of regulation (POR). The GCU 22 is also connected via a line 78 to the multiple output DC—DC converter 44 to control the same, as discussed below.

Figure 3:
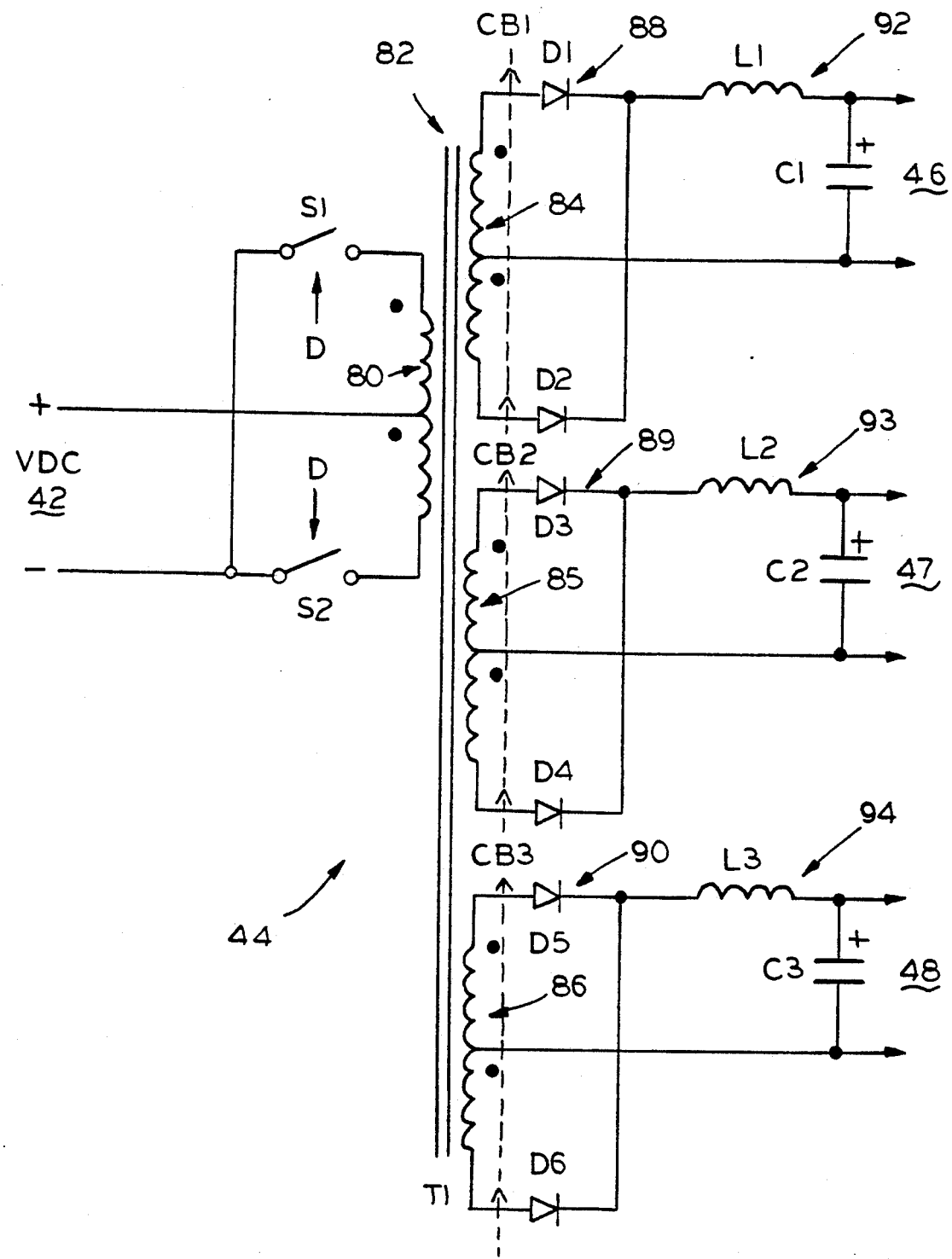
FIG. 3 is a schematic diagram illustrating the DC—DC converter of FIG. 2.

With reference to FIG. 3, a schematic illustrates a circuit for the multiple output DC—DC converter 44. In the illustrated embodiment, the converter 44 comprises a switchmode power converter. The converter 44 receives DC power from the DC link 42 and connects it through a pair of switches S1 and S2 to the primary winding 80 of a transformer 82. Specifically, the plus side of the DC link is connected to a center tap of the primary winding, while the negative side of the DC link 42 is connected through the switches S1 and S2 to end taps of the primary winding 80. Although in the illustration the switches S1 and S2 are shown as electromechanical switches, preferably, the switches S1 and S2 are semi-conductor switches which receive drive signals, represented by the letter D, from the GCU 22. The switches S1 and S2 are alternated by the GCU in any known manner to produce high frequency AC power on the order of 50–100k Hz through the primary winding 80.

The transformer 82 includes three secondary windings 84–86. As is conventional with transformer operation, each of the secondary windings 84–86 develops AC power at the frequency of power in the primary winding 80. Each respective secondary winding 84–86 is connected through a respective AC circuit breaker CB1–CB3 to rectifier bridges 88–90 comprising diodes D1–D2, D3–D4, and D5–D6, respectively, to produce DC power. The rectifier bridges 88–90 are connected through respective LC low pass ripple filters 92–94 to develop the isolated DC power on the busses 46–48. Particularly, owing to transformer action, the power on each of the respective busses 46–48 is magnetically isolated. The converter 44 operates as an active filter which significantly reduces the requirements of the ripple filters 92–94. Because of the high frequency of operation, i.e, above 50–100kHz, the size of the isolation transformer 82 is small. The ripple filters 92–94 comprise low-pass filters which reduce the rectification ripple to satisfy standard requirements. Since the converter 44 acts as an active filter, as discussed above, the size of the ripple filters 92–94 is smaller than would otherwise be necessary. With reference again to FIG. 2, owing to the use of smaller ripple filters 92–94, the damper circuits 50–52 can be much smaller than in a conventional system. The damper circuits, although not specifically shown, comprise a series connected resistor and capacitor across the output of the busses 46–48 and are operable to reduce the Q of the ripple filters 92–94, as is well known.

Owing to the use of magnetic isolation between the busses 46–48, voltage transients created by the pulsating loads 66 are significantly reduced at the point of regulation to further improve operation. Further, since the converter 44 converts power to high frequency AC, then AC circuit breakers and current sensors may be utilized. The use of AC circuit breakers is advantageous since use of DC circuit breakers in a conventional DC system creates arcing during circuit breaker operation. Conversely, with AC circuit breakers, lines may be more easily broken due to plurality changes of AC signals. Further, DC current sensors, such as Hall effect sensors, can be replaced with AC current sensors, such as current transformers.

FIGS. 4-7 illustrate alternative embodiments for an electrical power generating system in accordance with the invention. In each case, the system includes certain elements similar to those discussed above relative to the embodiment of FIG. 2. For simplicity in describing each embodiment, like elements are referenced with like reference numerals offset by a multiple of 100. For example, element 10 of FIG. 2 corresponds to element 110 of FIG. 4 and element 210 of FIG. 5.

Figure 4:
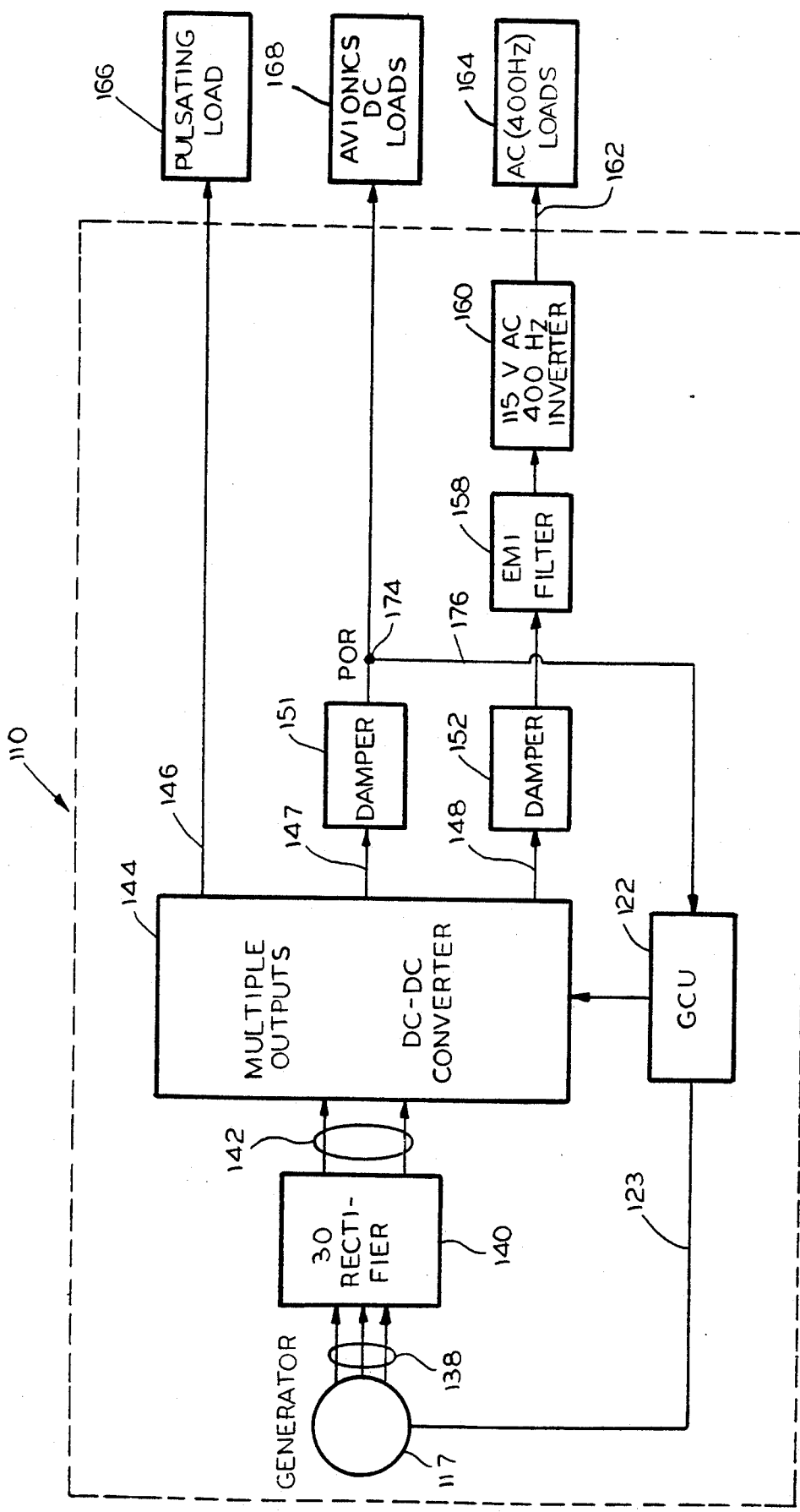
FIG. 4 is a generalized more detailed block diagram of an EPGS according to a second embodiment of the invention.

With reference to FIG. 4, an EPGS 110 according to a second embodiment of the invention is illustrated. The EPGS 10 is virtually identical to the EPGS 10 of FIG. 2, except that the pulsating loads 166 are directly controlled from the power on the first isolated DC output bus 146 from the DC—DC converter 144. Particularly, the function of the damper circuit 50, EMI filter 70 and converter 72 of FIG. 2 are implemented as part of the multiple output DC—DC converter 144 by employing the circuit elements together in one circuit. Such an embodiment significantly reduces the overall system weight.

Figure 5:
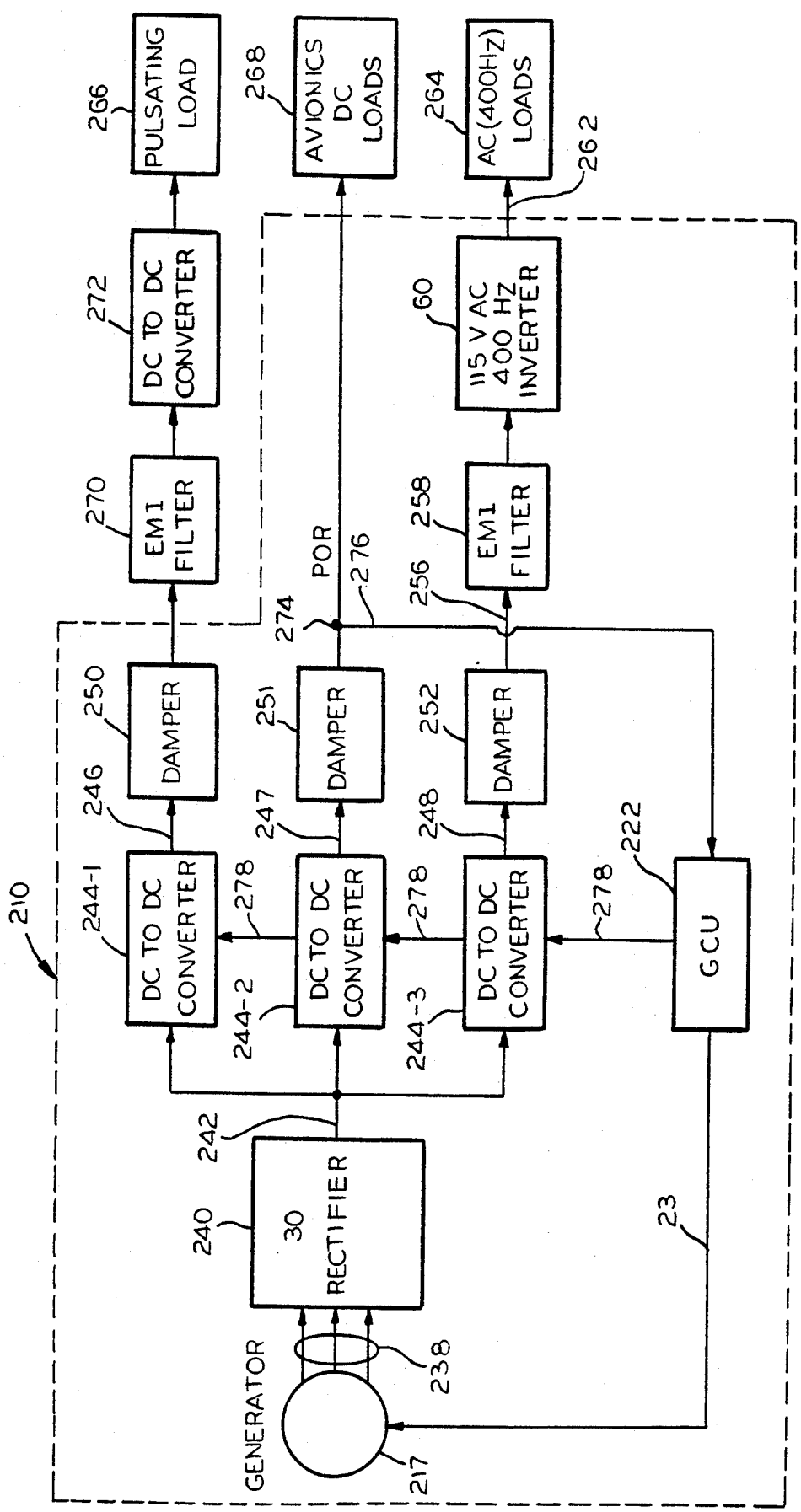
FIG. 5 is a generalized more detailed block diagram of an EPGS according to a third embodiment of the invention.

With reference to FIG. 5, an EPGS 210 according to a third embodiment of the invention is illustrated. The EPGS 210 differs from the EPGS 10 of FIG. 2 in that the multiple output DC—DC converter 44 of FIG. 2 is replaced by three smaller single output DC—DC converters 244-1, 244-2 and 244-3. Each of the converters 244-1-244-3 comprises a switchmode power converter such as is illustrated in FIG. 3, each being provided with a single secondary winding. Thus, a primary winding of each converter 244 is connected to the DC link 242 and each develops DC power on its associated output bus 246-248 which is magnetically isolated from one another. This arrangement reduces system interactions and improves system modularity.

Figure 6:
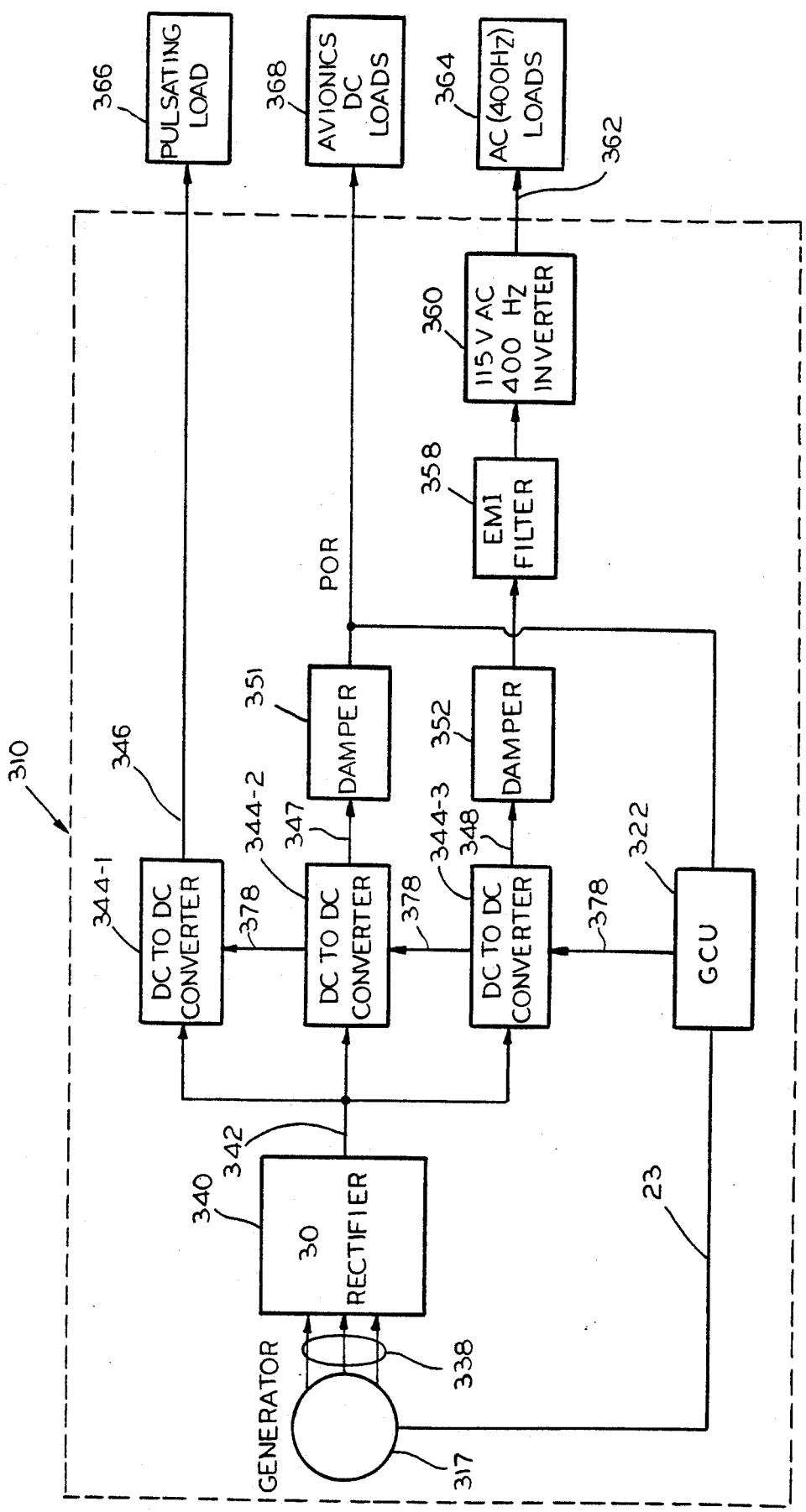
FIG. 6 is a generalized more detailed block diagram of an EPGS according to a fourth embodiment of the invention.

With reference to FIG. 6, an EPGS 310 according to a fourth embodiment of the invention is illustrated. The EPGS 310 combines the changes made from both the EPGS's 110 and 210 relative to the embodiment 10 of FIG. 2. Particularly, the multiple output DC—DC converter 44 of FIG. 2 is replaced with three separate DC—DC converters 344-1 through 344-3, as with the embodiment of FIG. 5, and further the damper 50, EMI filter 70 and DC—DC converter 72 of FIG. 2, are combined in the first DC—DC converter 344-1, as with the EPGS 110 of FIG. 4. This construction reduces overall system weight as well as reducing system interactions and improving system modularity.

Figure 7:
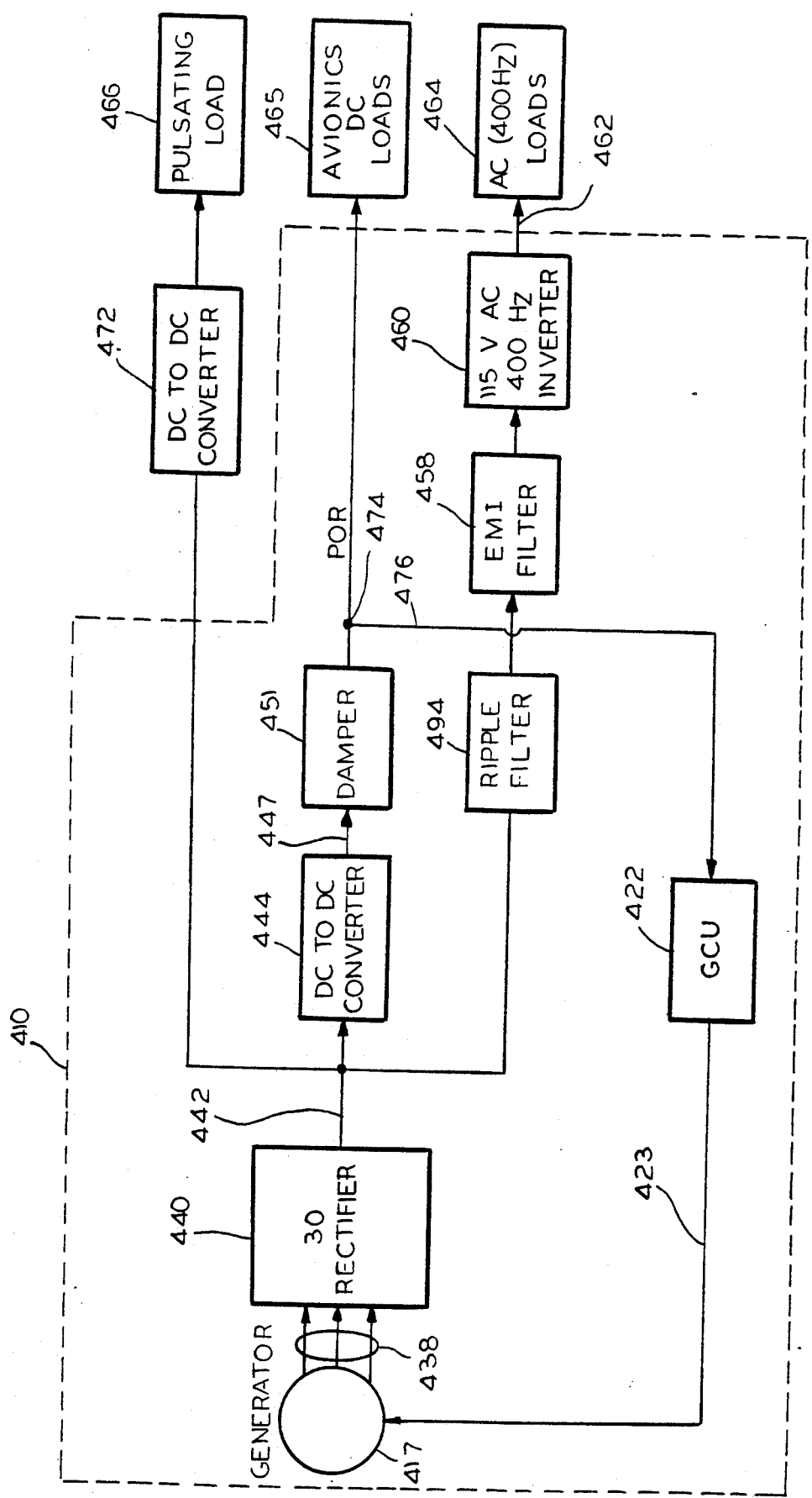
FIG. 7 is a generalized more detailed block diagram of an EPGS according to a fifth embodiment of the invention.

Finally, with reference to FIG. 7, an EPGS 410 according to a fifth embodiment of the invention is illustrated. The EPGS 410 differs from the EPGS of 10 of FIG. 2 in providing only a single DC—DC converter 444 and damper 451 for powering the avionics DC loads 468. Power to the pulsating loads 446 is provided directly from the DC link 442 via a DC—DC converter 472. However, since the DC—DC converter 444 includes a transformer, such as illustrated in FIG. 3, suitable isolation is provided between the pulsating loads 466 and the avionics DC loads 468. In this embodiment, the DC—DC converter to the inverter 460 is eliminated and merely replaced by a ripple filter 494 for providing reduction of rectification ripple, as noted above.

Thus, in accordance with the invention, electrical power generating system develops isolated power for powering DC loads and pulsating loads, and in several of the embodiments also for powering AC loads. Thus, the system is operable to reduce the effect of pulsating loads on avionics DC loads, reduce size and weight of DC bus ripple filters, provide full system isolation, and allow DC circuit breakers and current sensors of prior systems to be replaced with AC circuit breakers and current sensors.

The disclosed embodiments are illustrative of the broad inventive concepts comprehended hereby.

We claim:

1. An electrical power generating system (EPGS) for developing isolated power for powering DC loads, pulsating loads, and AC loads, comprising:
   a generator including a main generator and an exciter providing field current to the main generator for developing AC power;
   a rectifier connected to the main generator for converting AC power to DC power;
   a DC—DC converter connected to said rectifier and including means for developing DC power supplied to three DC power busses, each said bus being electrically isolated from one another, a first said bus for powering DC loads, and a second said bus for powering pulsating loads;
   a DC-AC converter connected to a third said bus for converting DC power to AC power for powering AC loads;
   means for sensing a characteristic of DC power supplied to one of said three DC power busses; and
   a generator control unit (GCU) connected to said sensing means and said generator for controlling generator developed AC output power responsive to said sensed characteristic.

2. The EPGS of claim 1 wherein said developing means comprises a transformer having a single primary winding and three secondary windings.

3. The EPGS of claim 1 wherein said developing means comprises three transformers each having a primary winding and a secondary winding.

4. The EPGS of claim 1 wherein said developing means includes a switching circuit connected to said rectifier and switched at a relatively high frequency to produce high frequency AC power, a transformer having a primary winding connected to said switching circuit and a secondary winding, and a rectifier circuit connected to said secondary winding for converting the high frequency AC power to DC power.

5. The EPGS of claim 1 further comprising a damper circuit connected across each said isolated DC power bus.

6. The EPGS of claim 1 wherein said developing means further comprises a damper circuit connected across said second bus.

7. The EPGS of claim 4 further comprising an AC circuit breaker connected in series with said secondary winding.

8. The EPGS of claim 1 wherein said GCU controls excitation of said exciter responsive to said sensed characteristic.

9. An electrical power generating system (EPGS) for developing isolated power for powering DC loads, pulsating loads, and AC loads, comprising:
- a generator including a main generator and an exciter providing field current to the main generator for developing AC power;
- a rectifier connected to the main generator for converting AC power to DC power;
- A DC—DC converter connected to said rectifier and including means for developing DC power supplied to two DC power busses, each said bus being electrically isolated from one another, a first said bus for powering DC loads, and a second said bus for powering pulsating loads;
- a DC-AC converter connected to said rectifier for converting DC power isolated from said first and second power busses to AC power for powering AC loads;
- means for sensing a characteristic of DC power supplied to one of said two DC busses; and
- a generator control unit (GCU) connected to said sensing means and said generator for controlling generator developed AC output power responsive to said sensed characteristic.

10. The EPGS of claim 9 wherein said developing means comprises a transformer having a single primary winding and two secondary windings.

11. The EPGS of claim 9 wherein said developing means comprises two transformers each having a primary winding and a secondary winding.

12. The EPGS of claim 9 wherein said developing means includes a switching circuit connected to said rectifier and switched at a relatively high frequency to produce high frequency AC power, a transformer having a primary winding connected to said switching circuit and a secondary winding, and a rectifier circuit connected to said secondary winding for converting the high frequency AC power to DC power.

13. The EPGS of claim 9 further comprising a damper circuit connected across said first DC power bus.

14. The EPGS of claim 9 wherein said developing means further comprises a damper circuit connected across said second bus.

15. The EPGS of claim 12 further comprising an AC circuit breaker connected in series with said secondary winding.

16. The EPGS of claim 9 wherein said GCU controls excitation of said exciter responsive to said sensed characteristic.

* * * * *